(12) United States Patent
Ma et al.

(10) Patent No.: US 12,305,789 B1
(45) Date of Patent: May 20, 2025

(54) INVERSION LINING REHABILITATION EQUIPMENT AND METHOD FOR PIPE REHABILITATION AND REINFORCEMENT

(71) Applicant: SUN YAT-SEN UNIVERSITY, Guangdong (CN)

(72) Inventors: Baosong Ma, Guangdong (CN); Chunliang He, Guangdong (CN); Sheng Huang, Guangdong (CN)

(73) Assignee: SUN YAT-SEN UNIVERSITY, Guangdong (CN)

( * ) Notice: Subject to any disclaimer, the term of this patent is extended or adjusted under 35 U.S.C. 154(b) by 0 days.

(21) Appl. No.: 18/979,804

(22) Filed: Dec. 13, 2024

(30) Foreign Application Priority Data

Feb. 4, 2024 (CN) .......................... 202410155945.4

(51) Int. Cl.
*F16L 55/165* (2006.01)
(52) U.S. Cl.
CPC ................................ *F16L 55/1651* (2013.01)
(58) Field of Classification Search
CPC .................................................. F16L 55/1651
USPC .......................................................... 138/89
See application file for complete search history.

(56) References Cited

U.S. PATENT DOCUMENTS

| 5,167,901 | A | * | 12/1992 | Driver | F16L 55/1651 |
| | | | | | 264/269 |
| 5,816,293 | A | * | 10/1998 | Kiest, Jr. | F16L 55/179 |
| | | | | | 264/269 |
| 10,030,486 | B1 | * | 7/2018 | Keller | F04B 43/02 |
| 2004/0134551 | A1 | * | 7/2004 | Warren | B29C 63/0069 |
| | | | | | 405/150.1 |
| 2006/0159791 | A1 | * | 7/2006 | Kamiyama | B29C 63/36 |
| | | | | | 264/516 |
| 2007/0113971 | A1 | * | 5/2007 | Driver | F16L 55/1651 |
| | | | | | 156/287 |
| 2010/0295198 | A1 | * | 11/2010 | Kiest, Jr. | B29C 63/36 |
| | | | | | 118/317 |
| 2013/0014847 | A1 | | 1/2013 | Jang | |

(Continued)

FOREIGN PATENT DOCUMENTS

| CN | 102207236 A | 10/2011 |
| CN | 105257948 A | 1/2016 |

(Continued)

*Primary Examiner* — David R Deal
(74) *Attorney, Agent, or Firm* — Yue (Robert) Xu; Apex Attorneys at Law, LLP

(57) ABSTRACT

Inversion lining rehabilitation equipment and method for pipe rehabilitation and reinforcement are disclosed. The equipment includes a working vehicle, a power supply unit, a matrix mixing device, a hose impregnating and flattening device, a hose inversion device and a movable bracket. The working vehicle has a box body and a vehicle-mounted support frame. The box body has a first accommodation space, which accommodates a dry hose material storage area, a matrix material storage area, a guide tube storage area, the power supply unit, the matrix mixing device and the hose impregnating and flattening device. The hose inversion device includes an inversion machine and an air pump. The movable bracket includes a bracket body. The top of the vehicle-mounted support frame and the top of the bracket body are respectively provided with a first mounting seat and a second mounting seat to be detachably connected to the inversion machine.

12 Claims, 14 Drawing Sheets

(56) References Cited

U.S. PATENT DOCUMENTS

| | | | | |
|---|---|---|---|---|
| 2014/0109980 A1* | 4/2014 | Karunakaran | ...... | B29C 63/0017 137/15.08 |
| 2015/0020908 A1* | 1/2015 | Warren | ............... | F16L 55/1651 138/97 |
| 2015/0114507 A1* | 4/2015 | Warren | ............... | F16L 55/1645 138/98 |
| 2016/0061374 A1* | 3/2016 | Bichler | ............. | G06K 7/10366 138/97 |
| 2016/0096188 A1* | 4/2016 | Tanner | .................. | B05D 7/222 427/230 |
| 2016/0258566 A1 | 9/2016 | Waring et al. | | |
| 2020/0263821 A1* | 8/2020 | Sterner | .................. | F16L 55/18 |

FOREIGN PATENT DOCUMENTS

| | | |
|---|---|---|
| CN | 205678356 U | 11/2016 |
| CN | 207674022 U | 7/2018 |
| CN | 116624696 A | 8/2023 |
| CN | 117404551 A | 1/2024 |

\* cited by examiner

INVERSION LINING REHABILITATION EQUIPMENT AND METHOD FOR PIPE REHABILITATION AND REINFORCEMENT

CROSS-REFERENCE TO RELATED APPLICATIONS

The present application claims the priority to Chinese Patent Application No. 202410155945.4, titled "INVERSION LINING REHABILITATION EQUIPMENT AND METHOD FOR PIPE REHABILITATION AND REINFORCEMENT", filed with the China National Intellectual Property Administration on Feb. 4, 2024, the entire disclosure of which is incorporated herein by reference.

FIELD

The present disclosure relates to the technical field of pipe rehabilitation, and in particular to inversion lining rehabilitation equipment and method for pipe rehabilitation and reinforcement.

BACKGROUND

Ambient cured-in-place pipe lining is a trenchless rehabilitation technology for buried pipes, which gradually came into use in recent years. The principle of this method is to invert a hose impregnated with a matrix by 180 degrees and place it into an original damaged pipe. The inverted hose then is tightly bonded to the original damaged pipe into a whole under inflation pressure and cured at ambient temperature to achieve rehabilitation and reinforcement.

The ambient cured-in-place pipe lining involves multiple devices and steps for pipe rehabilitation and reinforcement, and therefore, it often takes a long time to complete the work. With the increase of urban underground pipe damages over the years, the current construction speed is increasingly unable to meet the needs for pipe rehabilitation and reinforcement in practice. Therefore, a technical problem to be solved by those skilled in the art is how to improve the construction efficiency of pipe rehabilitation and reinforcement as much as possible.

SUMMARY

The present disclosure provides the following technical solutions.

Inversion lining rehabilitation equipment for pipe rehabilitation and reinforcement includes:
  a working vehicle, provided with a box body and a vehicle-mounted support frame that is located at the rear of the vehicle, where the box body is provided with a first accommodation space, in which a dry hose material storage area, a matrix material storage area and a guide tube storage area are provided;
  a power supply unit, located in the first accommodation space;
  a matrix mixing device, located in the first accommodation space close to the front of the vehicle;
  a hose impregnating and flattening device, located in the first accommodation space close to the middle of the vehicle;
  a hose inversion device, including an inversion machine and an air pump; and
  a movable bracket, including a bracket body and a wheel arranged at the bottom of the bracket body, where the top of the vehicle-mounted support frame is provided with a first mounting seat to be detachably connected with the inversion machine, and the top of the bracket body is provided with a second mounting seat to be detachably connected with the inversion machine.

In an embodiment, the inversion lining rehabilitation equipment further includes a vacuum pumping device that is located in the first accommodation space and is connected to the matrix mixing device through a pipeline.

In an embodiment, in the inversion lining rehabilitation equipment, the hose impregnating and flattening device includes:
  a frame, provided with a conveying line in a direction from the front to the rear of the vehicle;
  a first pressure roller group, including at least one pair of smooth round rollers; and
  a second pressure roller group, including at least one pair of grooved rollers, where
  the second pressure roller group is located downstream of the first pressure roller group on the conveying line.

In an embodiment, in the inversion lining rehabilitation equipment, the conveying line includes a first conveying section located upstream of the first pressure roller group and a second conveying section located downstream of the second pressure roller group, where each of the first conveying section and the second conveying section is provided with a plurality of unpowered conveying rollers, and an end of the first conveying section away from the first pressure roller group extends upward at an angle.

In an embodiment, in the inversion lining rehabilitation equipment, the inversion machine includes:
  a sealing tube section, where an end of the sealing tube section is provided with an end plate having a hose inlet, and at least one sealing body is provided inside the sealing tube section and is deformable to be in seal contact with the hose;
  a pressurized tube section, where an end of the pressurized tube section is provided with a round hose outlet, and a first inflation body, which is inflatable and annular, is provided on an outer wall of the hose outlet; and
  a sealing assembly, located between the sealing tube section and the pressurized tube section, and including a first sealing plate, a second sealing plate and a sealer, where the sealer is clamped between the first sealing plate and the second sealing plate, each of the first sealing plate and the second sealing plate is provided with an elongated port for the hose to pass through, and the sealer is provided with an inflatable second inflation body.

In an embodiment, in the inversion lining rehabilitation equipment, a first sealing body and a second sealing body are sequentially arranged inside the sealing tube section in a direction from the hose inlet to the hose outlet, where the first sealing body includes a pair of sealing rollers, a spacing between the pair of sealing rollers is adjustable, a sealing curtain is connected between each of the pair of sealing rollers and an inner wall of the sealing tube section, and the second sealing body includes a pair of inflatable third inflation bodies.

In an embodiment, in the inversion lining rehabilitation equipment, the inversion machine includes:
  a machine body, including the sealing tube section, the pressurized tube section and the sealing assembly;
  a base, provided with a fixing mounting hole; and
  an adjusting mechanism, connected to the machine body and the base configured to adjust relative positions of the machine body and the base, where the adjusting mechanism includes a handwheel and a lifting rod drivingly connected to the handwheel, and the lifting rod is connected to the machine body.

In an embodiment, in the inversion lining rehabilitation equipment, the bracket body includes a lifting mechanism for adjusting a vertical distance between the second mounting seat and the wheel.

In an embodiment, in the inversion lining rehabilitation equipment, the lifting mechanism is a scissor lift mechanism.

An inversion lining rehabilitation method for pipe rehabilitation and reinforcement is provided, carried out with the inversion lining rehabilitation equipment according to any one of above solutions. The method includes the following steps:

driving the working vehicle to a worksite and parking the working vehicle with the rear of the vehicle facing a working hole on the ground, and mounting the inversion machine to the vehicle-mounted support frame or the movable bracket;

taking a matrix from the matrix material storage area and placing the matrix into the matrix mixing device to mix the matrix uniformly;

taking a dry hose from the dry hose material storage area, laying the dry hose on the hose impregnating and flattening device, filling the dry hose with the matrix discharged through a material discharge hole of the matrix mixing device, and flattening the dry hose with the pressure roller groups of the hose impregnating and flattening device to obtain a hose to be applied;

passing an end of the hose to be applied through the inversion machine, and inversing and fixing the end of the hose to be applied to an outlet of the inversion machine;

taking a guide tube from the guide tube storage area, placing one end of the guide tube into the working hole to align with a pipe to be repaired, and aligning the other end of the guide tube with the outlet of the inversion machine; and starting the air pump, and pushing the hose to be applied forward with pneumatic power, so that the hose to be applied enters the pipe to be repaired through the guide tube.

The inversion lining rehabilitation equipment provided by the present disclosure has the following beneficial effects.

The whole equipment is highly integrated. All of the devices needed for construction are integrated in the box body of the working vehicle, leading to small footprint and high flexibility of the entire equipment. By using the movable bracket, the inversion machine can reach a place where the on-site vehicle cannot access, so as to quickly cope with various worksite conditions, and the whole equipment is easy to operate without a large number of workers. The matrix mixing device and the hose impregnating and flattening device completely meet the requirements of on-site manufacturing of the hose liner, avoiding failures of the hose liner caused by factors such as temperature and humidity during transportation from other locations to the site, thereby reducing the risk of rework. Therefore, the inversion lining rehabilitation equipment provided by the present disclosure can effectively improve the construction efficiency of pipe rehabilitation and reinforcement.

BRIEF DESCRIPTION OF THE DRAWINGS

In order to more clearly illustrate technical solutions in embodiments of the present disclosure or in the conventional technology, the drawings to be used in the description of the embodiments or the conventional technology are briefly described hereinafter. Apparently, the drawings in the following description show only embodiments of the present disclosure, and other drawings may be obtained by those skilled in the art from the drawings without any creative work.

REFERENCE NUMERALS

Figure 1:
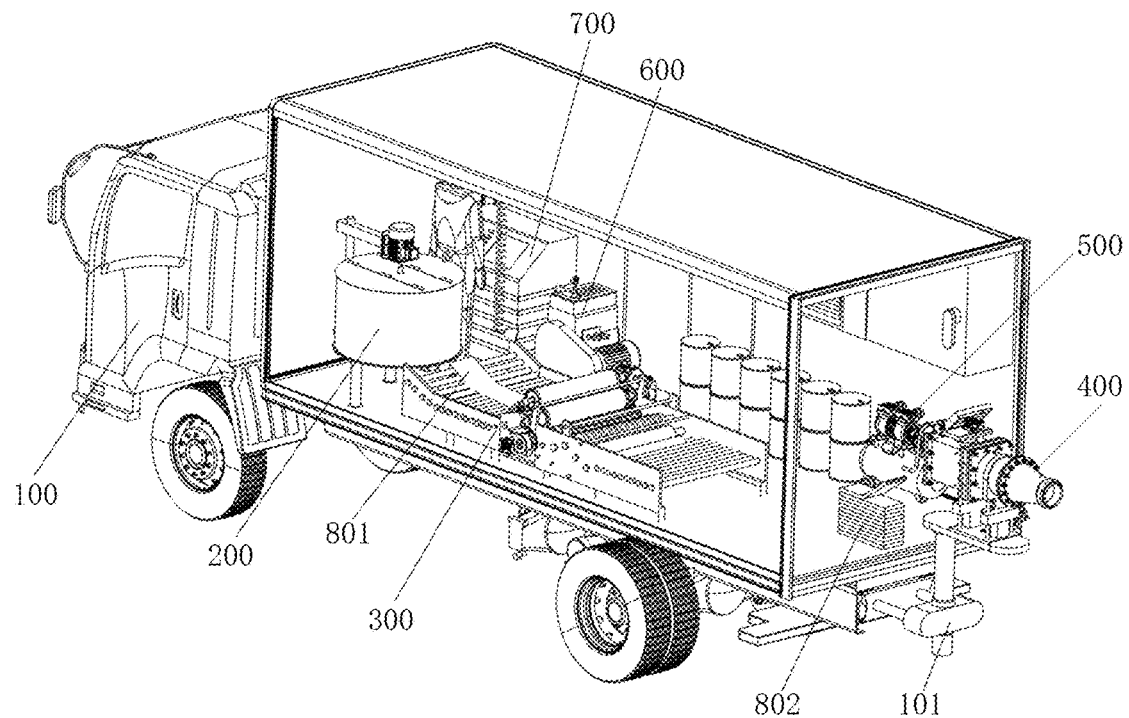
FIG. 1 is a perspective view of an inversion lining rehabilitation equipment for pipe rehabilitation and reinforcement according to an embodiment of the present disclosure.

100 working vehicle;
101 vehicle-mounted support frame;
102 movable bracket storage cabinet;
103 illuminating device;
104 dry hose material cabinet;
105 temperature control system;
106 vacuum suction pipeline device;
107 tool cabinet;
200 matrix mixing device;
201 mixing bin;
202 material discharge hole;
203 vacuum connection hole;
204 mixing motor;
300 hose impregnating and flattening device;
301 unpowered conveying roller;
302 smooth round roller;
303 first pressure roller adjusting device;
304 hose bracket;
305 grooved roller;
306 second pressure roller adjusting device;

400 inversion machine;
410 sealing tube section;
411 end plate;
412 hose inlet;
413 first pressure sensor;
414 second pressure sensor;
415 first sealing body;
416 second sealing body;
417 first pressurizing hole;
418 second pressurizing hole;
420 sealing assembly;
421 third pressurizing hole;
422 fourth pressurizing hole;
423 third pressure sensor;
424 fourth pressure sensor;
425 first sealing plate;
426 second sealing plate;
427 sealer;
428 second inflation body;
430 cylindrical section;
431 anti-inflation hole;
432 fifth pressurizing hole;
433 fifth pressure sensor;
440 conical section;
441 sixth pressurizing hole;
442 first inflation body;
450 handwheel;
460 control panel;
461 display;
462 cable hole;
463 main intake valve;
464 first control switch;
465 second control switch;
466 third control switch;
467 fourth control switch;
468 fifth control switch;
469 sixth control switch;
4610 seventh control switch;
470 fixing mounting hole;
500 air pump;
600 vacuum pumping device;
700 power supply unit;
800 dry hose;
801 hose in first state;
802 hose in second state;
803 hose in third state;
804 hose in fourth state;
900 matrix material;
110 guide tube;
120 working hole;
130 pipe to be repaired;
140 movable bracket;
141 unpowered roller;
142 wheel;
143 lifting mechanism;
144 positioning groove;
145 fixing rod;
146 telescopic arm.

DETAILED DESCRIPTION OF THE EMBODIMENTS

The technical solutions according to the embodiments of the present disclosure will be described clearly and completely as follows in conjunction with the drawings in the embodiments of the present disclosure. It is apparent that the described embodiments are only some of the embodiments according to the present disclosure, rather than all the embodiments. Any other embodiments obtained by those skilled in the art based on the embodiments of the present disclosure without any creative work fall within the protection scope of the present disclosure.

With reference to FIGS. 1 to 16, inversion lining rehabilitation equipment for pipe rehabilitation and reinforcement is provided according to an embodiment of the present disclosure, which includes a working vehicle 100, a power supply unit 700, a matrix mixing device 200, a hose impregnating and flattening device 300, a hose inversion device and a movable bracket 140. The working vehicle 100 is a vehicle carrying other devices, and a worker may drive the working vehicle 100 to transport the entire inversion lining rehabilitation equipment, e.g. from one worksite to another worksite. The working vehicle 100 has a box body and a vehicle-mounted support frame 101 that is located at the rear of the vehicle. The box body is provided with a first accommodation space, in which a dry hose material storage area, a matrix material storage area and a guide tube storage area are provided. It may be easily understood that the dry hose material storage area is for accommodating a dry hose 800 to be applied, the matrix material storage area is for accommodating a matrix material 900 to be applied, and the guide tube storage area is for accommodating a guide tube 110 to be applied. It should be noted that in FIGS. 1 and 2, some areas of the box body are illustrated as transparent to show the devices in the box body, and the first accommodation space provided in the box body is able to be enclosed. For example, when the working vehicle 100 is traveling, the door (not shown in the drawings) of the box body should be closed, so that the box body is enclosed. Specifically, the door of the box body is generally arranged at the rear of the box body, and the worker can get in and out of the box body after opening the door.

The power supply unit 700, the matrix mixing device 200 and the hose impregnating and flattening device 300 are all located in the first accommodation space. The matrix mixing device 200 is located in the first accommodation space close to the front of the vehicle, and the hose impregnating and flattening device 300 is located in the first accommodation space close to the middle of the vehicle. A position of the power supply unit 700 in the first accommodation space may be flexibly arranged as required. For example, the power supply unit 700 may be arranged close to the front of the vehicle. The power supply unit 700 is used to supply power to an electrical appliance of the inversion lining rehabilitation equipment.

Figure 3:
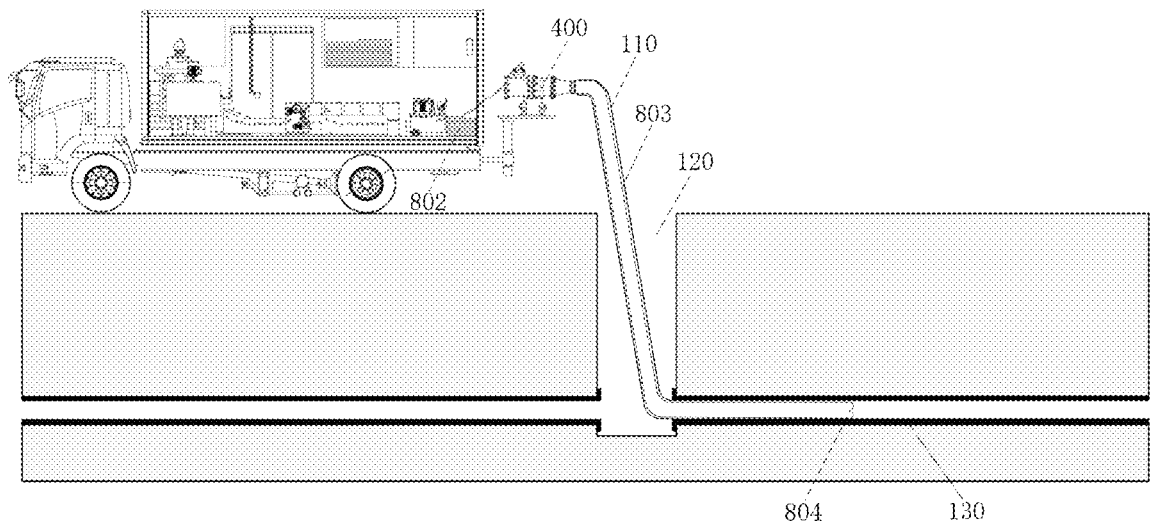
FIG. 3 is a schematic view showing a first construction manner of the inversion lining rehabilitation equipment according to an embodiment of the present disclosure.
Figure 16:
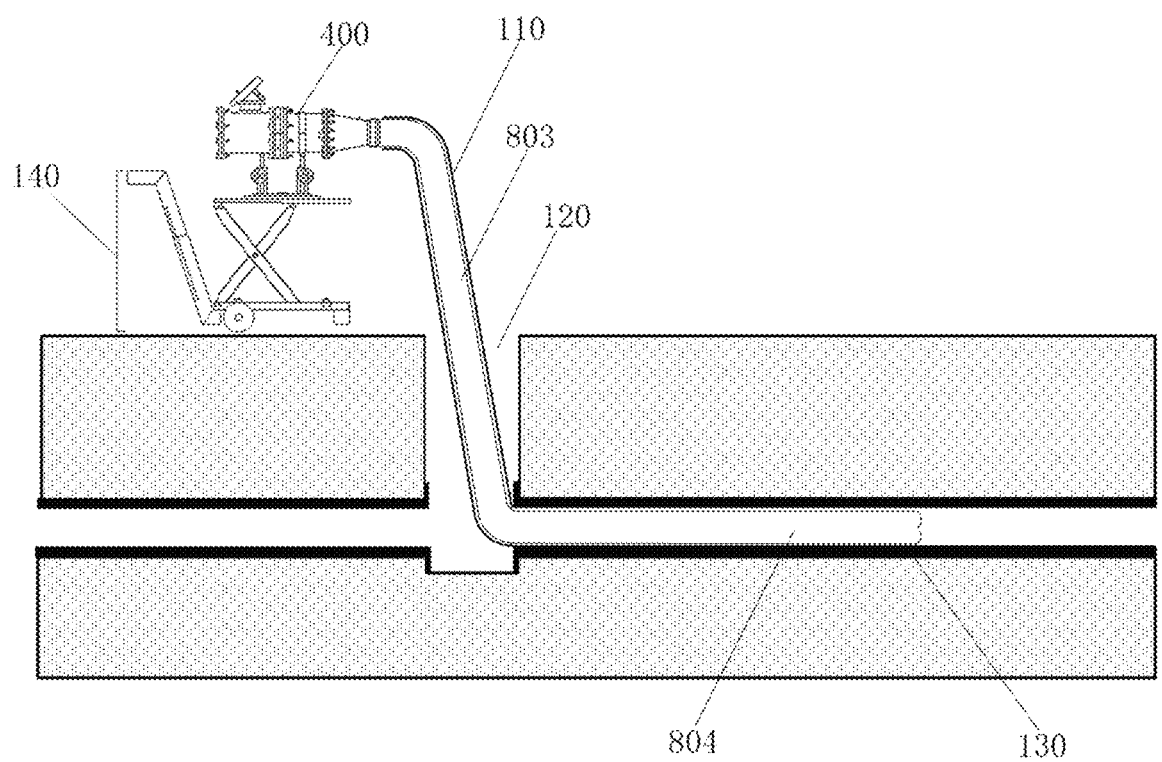
FIG. 16 is a schematic view showing a second construction manner of the inversion lining rehabilitation equipment according to an embodiment of the present disclosure.

The hose inversion device is used for inverting and pushing the hose, and includes an inversion machine 400 and an air pump 500. The air pump 500 can provide pneumatic power for pushing the hose forward. The movable bracket 140 includes a bracket body and a wheel 142 arranged at the bottom of the bracket body. It may be easily understood that the worker is able to easily push the bracket body with the wheel 142, so that the bracket body is movable. Both the vehicle-mounted support frame 101 and the movable bracket 140 are used to support the inversion machine 400 in correspondence with different construction manners respectively, That is, the top of the vehicle-mounted support frame 101 is provided with a first mounting seat to be detachably connected to the inversion machine 400, and the top of the bracket body is provided with a second mounting seat to be detachably connected to the inversion machine 400. As shown in FIGS. 3 and 16, in a first construction manner, the inversion machine 400 is fixedly mounted to the vehicle-mounted support frame 101, and in a second construction manner, the inversion machine 400 is fixedly mounted to the movable bracket 140.

Figure 4:
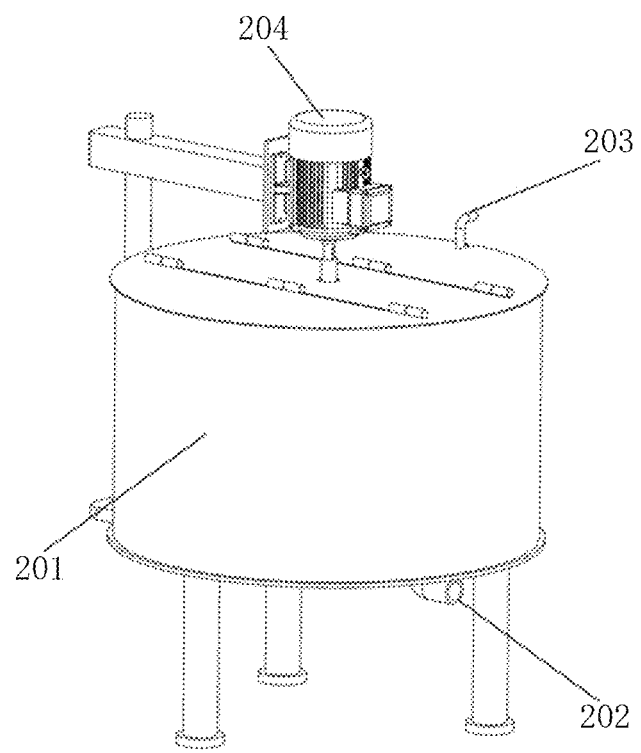
FIG. 4 is a schematic view of a matrix mixing device 200 shown in FIG. 1.

The matrix mixing device 200 is used to provide a mixed matrix material for impregnation. As shown in FIG. 4, a mixer driven by a mixing motor 204 is arranged in a mixing bin 201 of the matrix mixing device 200, and the mixing bin 201 is provided with a material discharge hole 202. The mixed matrix is directly introduced, through the material discharge hole 202, into the dry hose 800 that is placed on the hose impregnating and flattening device 300 in advance, thereby obtaining a hose 801 in a first state. In a preferred embodiment, the inversion lining rehabilitation equipment further includes a vacuum pumping device 600, which is located in the first accommodation space and is connected to the matrix mixing device 200 through a pipeline. As shown in FIG. 4, the mixing bin 201 is provided with a vacuum connection hole 203, and the vacuum pumping device 600 is connected to the vacuum connection hole 203 through the pipeline. The vacuum pumping device 600 is used for removing air bubbles generated during the mixing process of the matrix, so as to improve the quality of the matrix provided by the matrix mixing device 200. Specifically, the mixing bin 201 is generally a vertical cylindrical bin. The mixing motor 204 is located at the top of the mixing bin 201, and the bottom of the mixing bin 201 may be provide with multiple legs to keep the mixing bin 201 at a certain height relative to a floor of the box body. In this way, the matrix in the mixing bin 201 can flow out of the material discharge hole 202 under the action of gravity, and can be directly poured into the dry hose 800. Alternatively, in other embodiments, the material discharge hole 202 may be connected with a material discharge pipeline, on which a material discharge pump is arranged to pump the matrix in the mixing bin 201 into the dry hose 800.

Figure 5:
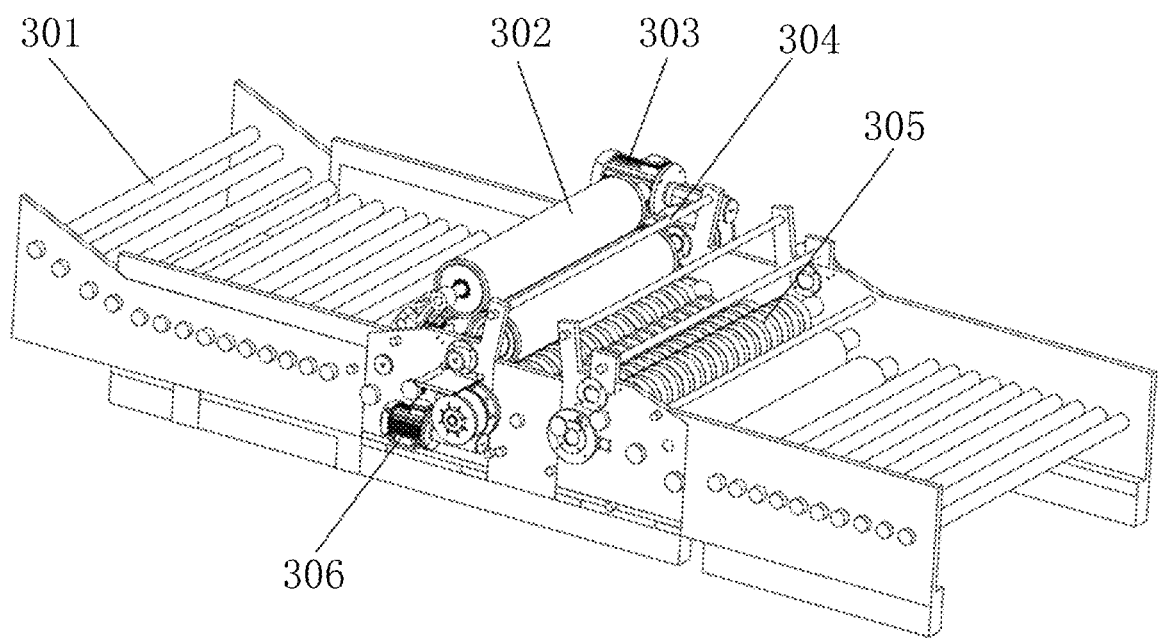
FIG. 5 is a schematic view of a hose impregnating and flattening device 300 shown in FIG. 1.

The dry hose 800 is filled with the mixed matrix to obtain the hose 801 in the first state. The hose impregnating and flattening device 300 is used for flattening and impregnating the hose 801 in the first state to obtain a hose 802 in a second state. As shown in FIG. 5, in a preferred embodiment, the hose impregnating and flattening device 300 includes a frame, a first pressure roller group and a second pressure roller group. The frame is provided with a conveying line in a direction from the front to the rear of the working vehicle 100. The second pressure roller group is located downstream of the first pressure roller group on the conveying line, that is, the hose 801 in the first state passes through the first pressure roller group before the second pressure roller group. The first pressure roller group includes at least one pair of smooth round rollers 302, and the second pressure roller group includes at least one pair of grooved rollers 305. The smooth round rollers 302 are used for flattening the hose and impregnating the hose with the matrix, while the grooved rollers 305 are used for fully impregnating the hose with the matrix again, which can further ensure the bonding of the two.

The first pressure roller group and the second pressure roller group are driven by a power device such as a motor. In a preferred embodiment, the hose impregnating and flattening device 300 is provided with a first pressure roller adjusting device 303 and a second pressure roller adjusting device 306. The first pressure roller adjusting device 303 provides power to the first pressure roller group to rotate the smooth round rollers 302, and is used for adjusting the spacing between the smooth round rollers 302. The second pressure roller adjusting device 306 provides power to the second pressure roller group to rotate the grooved rollers 305, and is used to adjust the spacing between the grooved rollers 305.

It is further preferable that, a third pressure roller group may be provided downstream of the second pressure roller group, and consists of smooth round rollers 302. The third pressure roller group is used for further flattening the hose. In order to facilitate the adjustment of the direction of the hose 801 in the first state, the hose impregnating and flattening device 300 may be provided with a hose bracket 304. After coming out of the first pressure roller group, the hose 801 in the first state is supported by the hose bracket 304, and then enters the second pressure roller group. In order to reduce the motion resistance of the hose 801 in the first state, the hose bracket 304 may include a rod body and a roller provided on the rod body. The friction between the roller and the rod body is much smaller than that between the roller and the hose 801 in the first state, and therefore, the motion resistance of the hose 801 in the first state is reduced and the abrasion of the hose is alleviated.

Further, the conveying line of the hose impregnating and flattening device 300 preferably includes a first conveying section located upstream of the first pressure roller group and a second conveying section located downstream of the second pressure roller group. Each of the first conveying section and the second conveying section is provided with multiple unpowered conveying rollers 301, and an end of the first conveying section away from the first pressure roller group extends upward at an angle. Specifically, each of the unpowered conveying rollers 301 may include a rod body and a roller provided on the rod body, and the friction between the roller and the rod body is much smaller than that between the roller and the hose 801 in the first state. As shown in FIGS. 1 and 5, since the end of the first conveying section away from the first pressure roller group extends upward at an angle, the matrix in the hose 801 in the first state can hardly flow backwards, thus preventing the matrix from flowing out of an end of the hose 801 in the first state away from the first pressure roller group.

Figure 2:
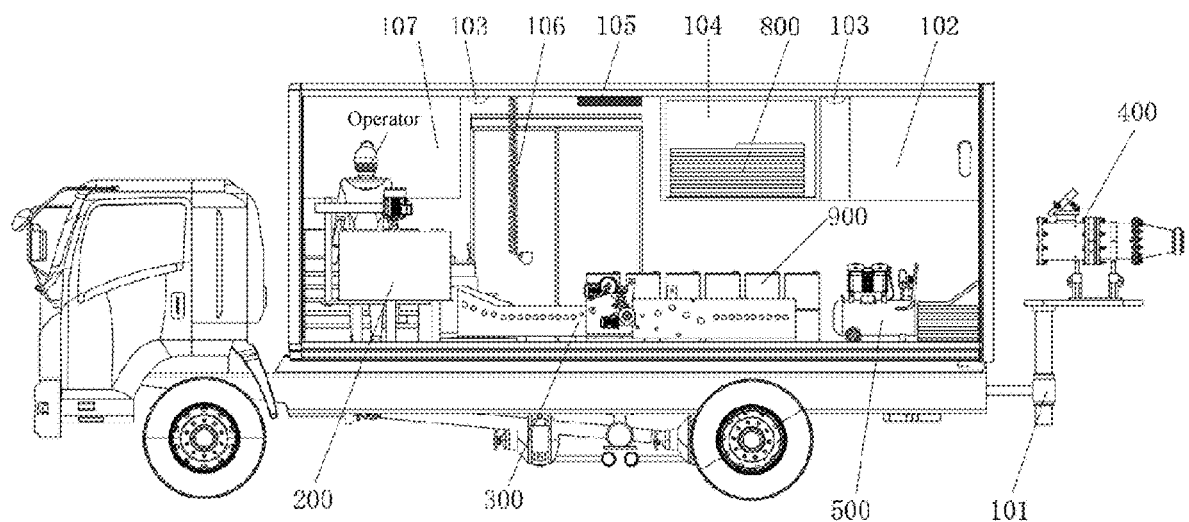
FIG. 2 is a front view of the inversion lining rehabilitation equipment according to an embodiment of the present disclosure.

As shown in FIGS. 1 and 2, in a preferred embodiment, a vacuum suction pipeline device 106 is arranged in the box body. The vacuum suction pipeline device 106 is connected to the vacuum pumping device 600 to pump air in the hose 801 in the first state which is being impregnated and flattened, so that the matrix can better fill and impregnate the hose.

With reference to FIGS. 6 to 13, in a preferred embodiment, the inversion machine 400 includes a sealing tube section 410, a pressurized tube section and a sealing assembly 420. The sealing assembly 420 is located between the sealing tube section 410 and the pressurized tube section. An end of the sealing tube section 410 is provided with an end plate 411 having a hose inlet 412, and at least one sealing body is provided inside the sealing tube section 410. The sealing body is deformable to be in seal contact with the hose. An end of the pressurized tube section is provided with a round hose outlet, a first inflation body 442, which is inflatable and annular, is provided on an outer wall of the hose outlet. The sealing assembly 420 includes a first sealing plate 425, a second sealing plate 426 and a sealer 427. The sealer 427 is clamped between the first sealing plate 425 and the second sealing plate 426. Each of the first sealing plate 425 and the second sealing plate 426 is provided with an elongated port for the hose to pass through, and the sealer 427 is provided with an inflatable second inflation body 428.

Figure 12:
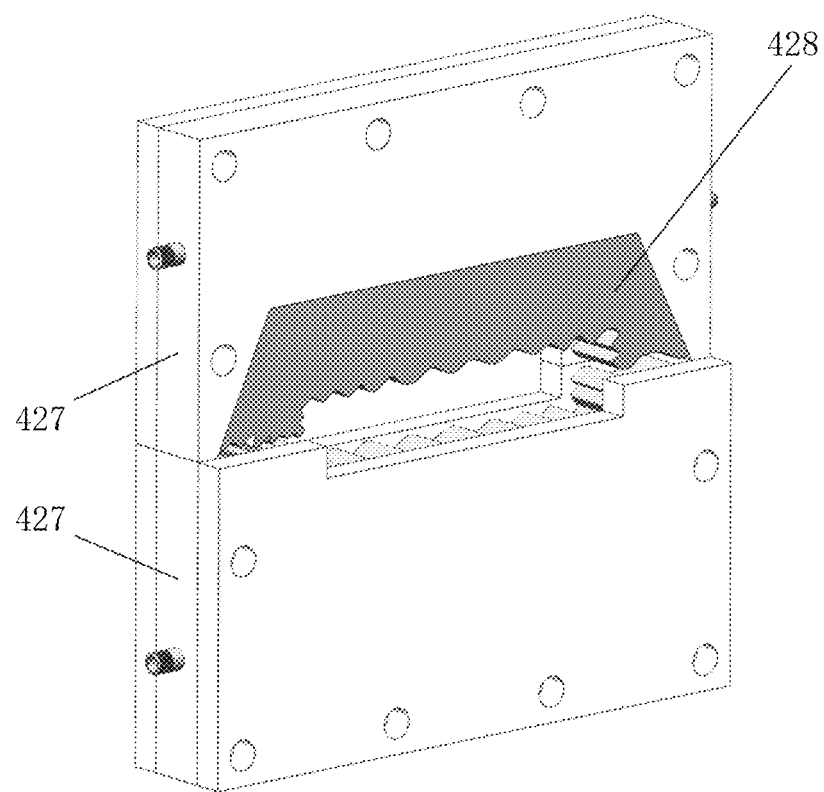
FIG. 12 is a schematic view illustrating an internal structure of the sealing assembly 420 shown in FIG. 11.

Before the hose is inverted and pushed, an end of the hose is inserted into the inversion machine 400 through the hose inlet 412, passing through the sealing tube section 410, the sealing assembly 420 and the pressurized tube section in the listed sequence, and then passing out of the hose outlet. After being inverted, the end of the hose is arranged and fixed on the first inflation body 442, so that an enclosed space is formed among the hose, the sealing assembly 420 and the pressurized tube section. When the hose is inverted and pushed, the air pump 500 continuously pumps air into the enclosed space. In this way, the hose may be pushed forward by the air pressure and inverted during the movement. Since the first inflation body 442 can expand into various outer diameters by inflation, it can better adapt to a variety of hoses with different sizes. When the end of the hose is inverted and fixed to the first inflation body 442, in addition to fixing the hose by the inflation force of the first inflation body 442, a hoop or a tie may be arranged behind the first inflation body 442 to further fix the hose. The second inflation body 428 of the sealer 427 can expand by inflation to apply inward compression, that is, the second inflation body 428 is in closer contact with the hose when its size is increased. As shown in FIG. 12, the second inflation body 428 may specifically be of a trapezoidal shape.

Figure 7:
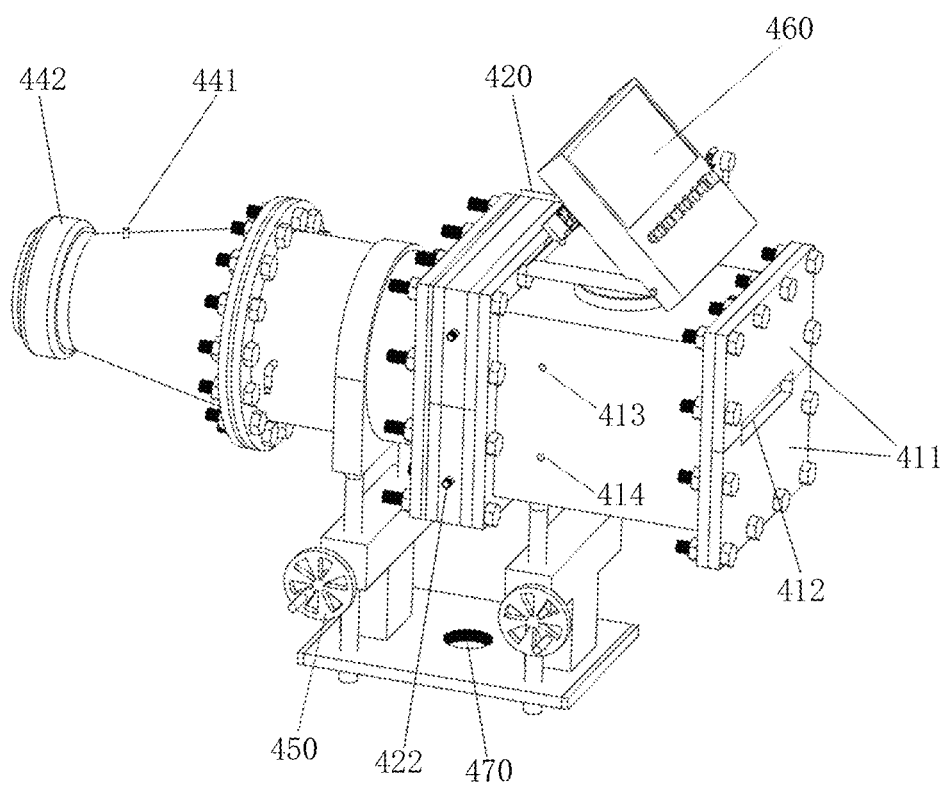
FIG. 7 is a perspective view of the inversion machine 400 shown in FIG. 1.
Figure 8:
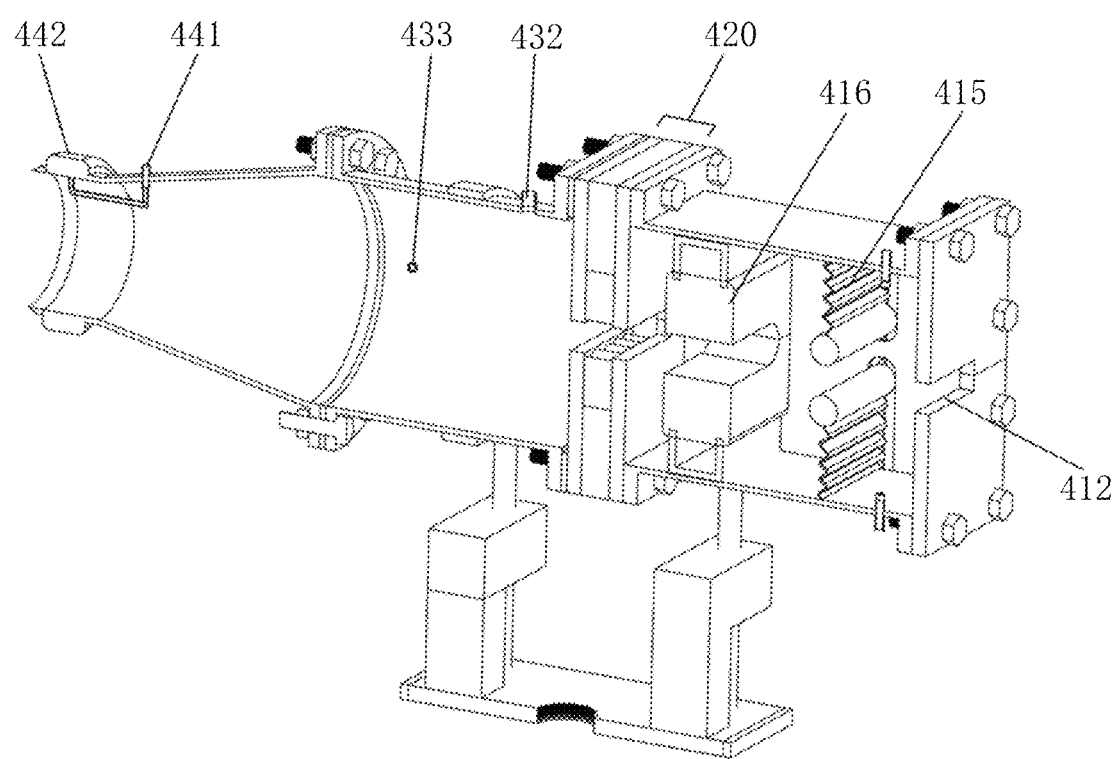
FIG. 8 is a schematic view illustrating an internal structure of the inversion machine 400 shown in FIG. 1.
Figure 9:
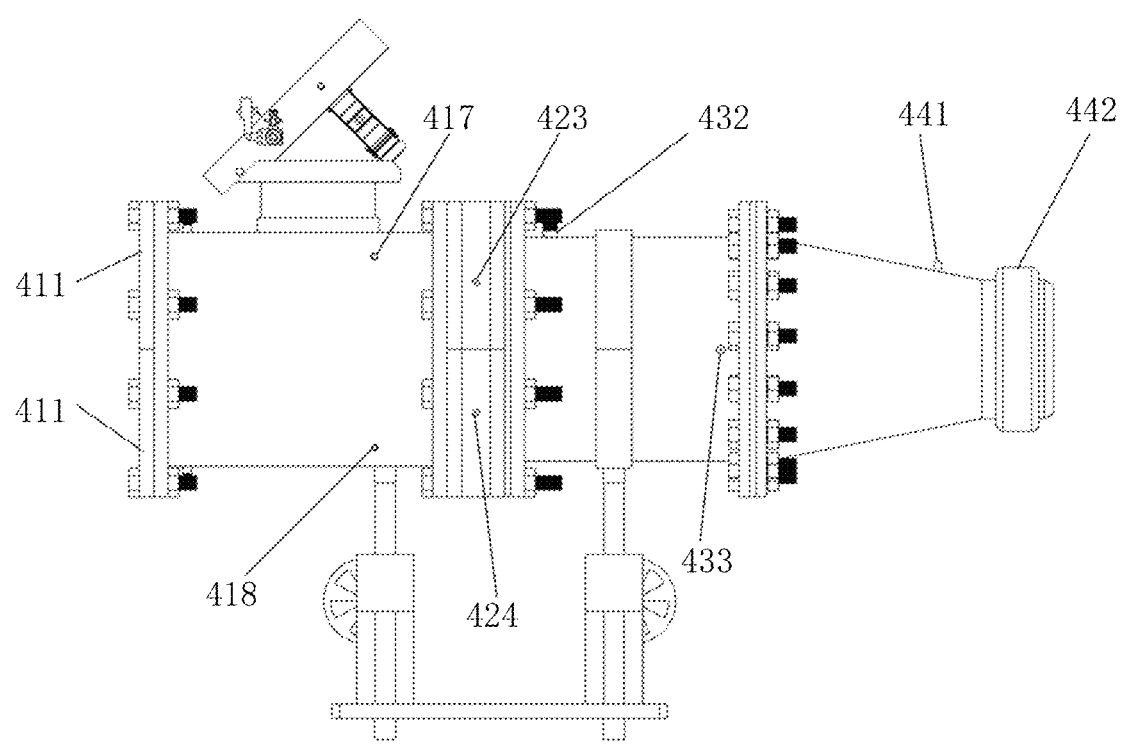
FIG. 9 is a back view of the inversion machine 400 shown in FIG. 1.
Figure 10:
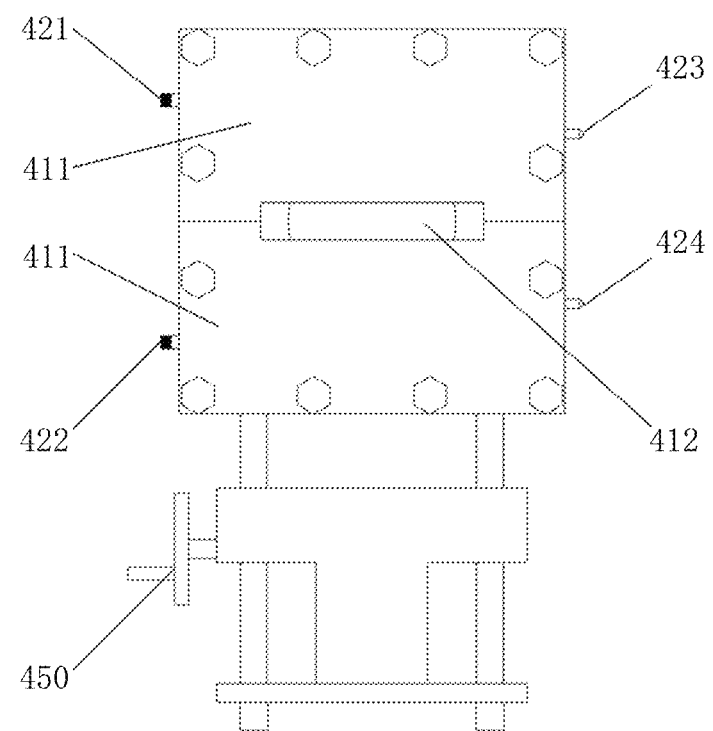
FIG. 10 is a right view of the inversion machine 400 shown in FIG. 1.
Figure 11:
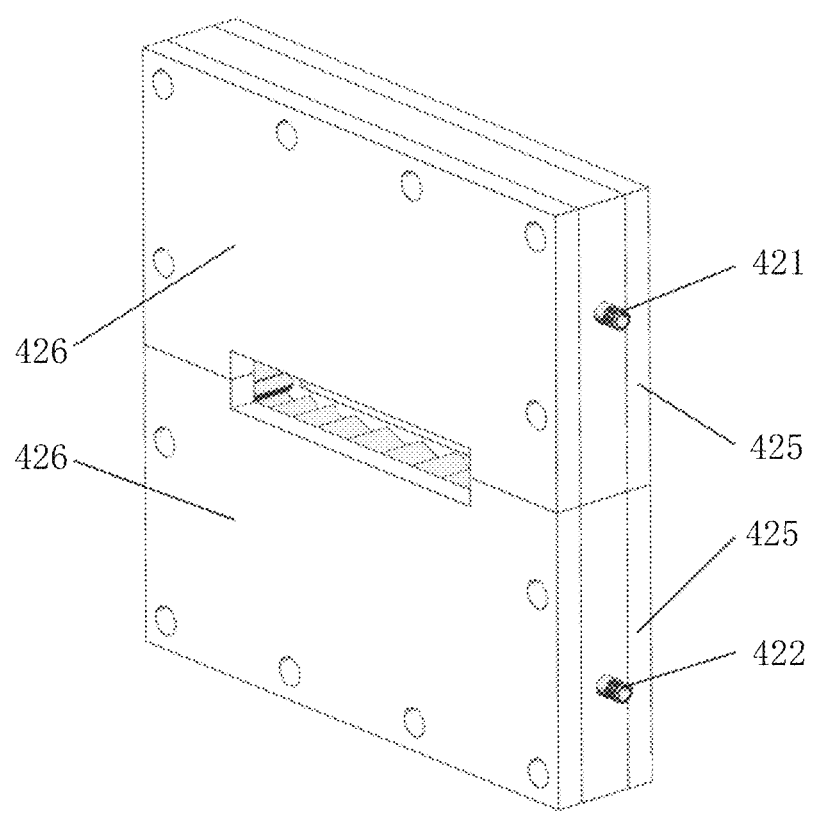
FIG. 11 is a schematic view of a sealing assembly 420 shown in FIG. 7.

As shown in FIG. 7, in this embodiment, the hose inlet 412 is formed between two end plates 411 which are spliced with each other in a vertical direction. A tube body of the sealing tube section 410 is provided with a flange structure connected to the end plates 411, and the end plates 411 are mounted on the tube body of the sealing tube section 410 by bolts. Specifically, the tube body of the sealing tube section 410 may be cuboid. The at least one sealing body is arranged inside the sealing tube section 410, so as to achieve multiple sealing functions in cooperation with the sealer 427 of the sealing assembly 420, thereby greatly improving the air tightness. As shown in FIG. 8, in a preferred embodiment, a first sealing body 415 and a second sealing body 416 are sequentially arranged in the sealing tube section 410 in a direction from the hose inlet 412 to the hose outlet. The first sealing body 415 includes a pair of sealing rollers, the spacing between the pair of sealing rollers is adjustable, and a sealing curtain is connected between each of the sealing rollers and an inner wall of the sealing tube section 410. The second sealing body 416 includes a pair of inflatable third inflation bodies. The third inflation bodies may expand by inflation, applying inward compression, that is, the third inflation body is in closer contact with the hose when its size is increased.

Figure 6:
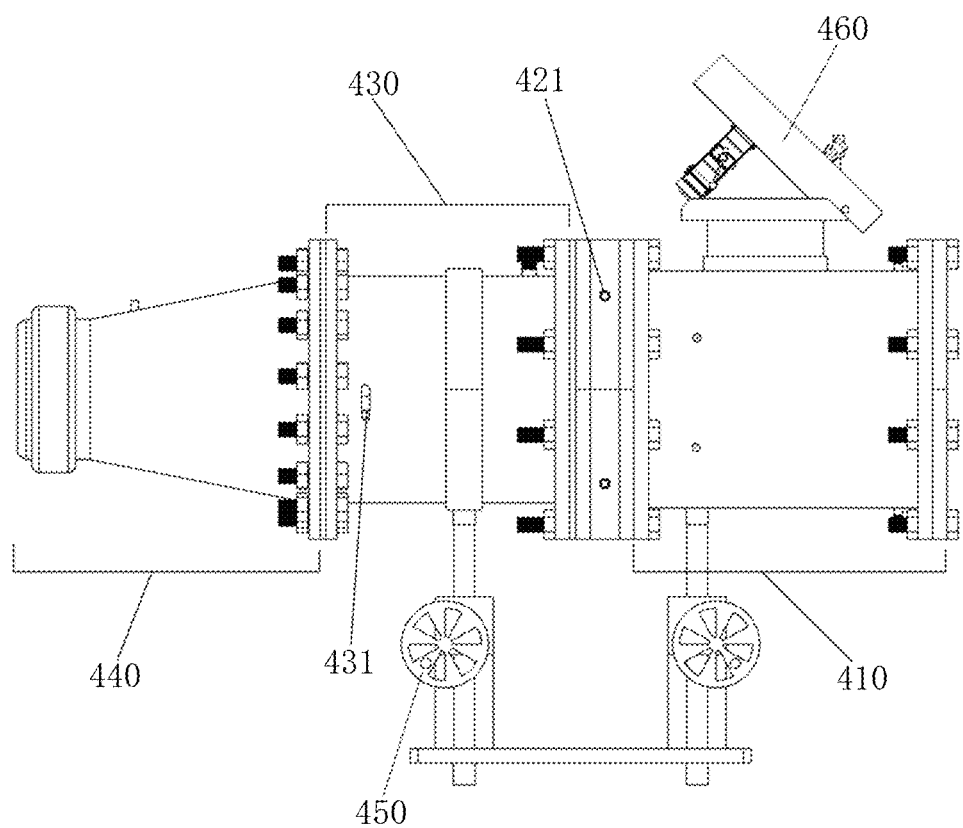
FIG. 6 is a front view of an inversion machine 400 shown in FIG. 1.

As shown in FIGS. 6 and 7, it is further preferable that the pressurized tube section includes a cylindrical section 430 and a conical section 440. The cylindrical section 430 is connected to a larger end of the conical section 440 by fasteners, or the cylindrical section 430 and the conical section 440 are an integrated structure. The hose outlet described hereinabove is arranged at a smaller end of the conical section 440. In a preferred embodiment, the inversion machine 400 includes a machine body, a base and an adjusting mechanism. The machine body includes the sealing tube section 410, the pressurized tube section and the sealing assembly 420. The base is provided with a fixing mounting hole 470 to be connected to the first mounting seat and the second mounting seat. The adjusting mechanism is connected to the machine body and the base of the inversion machine 400 and is configured to adjust relative positions of the machine body and the base. The adjusting mechanism includes a handwheel 450 and a lifting rod which is drivingly connected to the handwheel 450 and is connected to the machine body. The worker can lift or lower the lifting rod by turning the handwheel 450, thereby changing a distance between the machine body and the base of the inversion machine 400. It is further preferable that, each of the sealing tube section 410 and the pressurized tube section is connected with the adjusting mechanism, and the sealing tube section 410 and the pressurized tube section are respectively hinged to upper ends of the lifting rods. By operating the handwheels 450 of the two adjusting mechanisms, a pitching angle of the machine body relative to the base can be adjusted, so that the inversion machine 400 can better meet the requirements of the worksite for the angle of the machine body.

Figure 13:
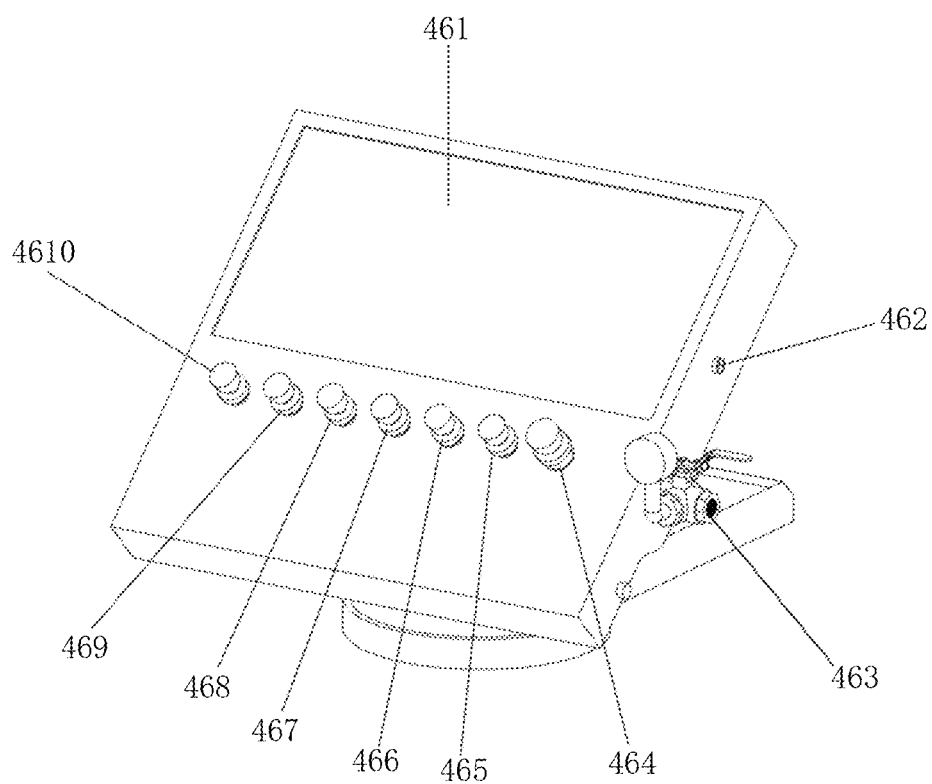
FIG. 13 is a schematic view of a control panel 460 shown in FIG. 7.

In a preferred embodiment, a control panel 460 of the inversion machine 400 is arranged at the top of the sealing tube section 410. Specifically, a horizontally rotatable base seat may be arranged at the top of the sealing tube section 410, and the control panel 460 is arranged at a certain angle relative to the base seat. As shown in FIG. 6, a lower end of the control panel 460 is hinged to the base seat, and the back of the control panel 460 is connected to the base seat through a diagonal support with an adjustable length. In this way, the control panel 460 can be adjusted through up-and-down and left-and-right rotations, and it is more convenient for the worker to operate components such as switches on the front of the control panel 460. As shown in FIG. 13, in this embodiment, the control panel 460 is provided with a display 461, a cable hole 462, a main intake valve 463 and multiple control switches. The main intake valve 463 is connected to the air pump 500 through a pipeline. A first control switch 464 is used to regulate the total intake pressure, and other control switches are used to regulate the pressure in branch pipelines. For example, a second control switch 465 is connected to a fifth pressurizing hole 432 arranged at the pressurized tube section through a pipeline, to provided internal pressure for the pressurized tube section. A third control switch 466 and a fourth control switch 467 are respectively connected to a first pressurizing hole 417 and a second pressurizing hole 418 of the second sealing body 416 through pipelines. A fifth control switch 468 and a sixth control switch 469 are respectively connected to a third pressurizing hole 421 and a fourth pressurizing hole 422 of the sealing assembly 420 through pipelines, so as to provide inflation pressure to the second inflation body 428. A seventh control switch 4610 is connected to a sixth pressurizing hole 441 fixed on the pressurized tube section through a pipeline, so as to provide inflation pressure to the first inflation body 442. As shown in FIG. 8, the first inflation body 442 is connected to the sixth pressurizing hole 441 through a pipeline.

The cable hole 462 provides a mounting channel for cables connecting the control panel 460 to external devices, that is, the cables are inserted into the control panel 460 through the cable hole 462 to be electrically connected to a circuit board of the control panel 460. For example, the inversion machine 400 is provided with multiple pressure sensors, and the cables which connect these pressure sensors to the control panel 460 pass through the cable holes 462. As shown in FIGS. 6 to 12, in this embodiment, a first pressure sensor 413 and a second pressure sensor 414 are used to measure an internal pressure of the first sealing body 415, a third pressure sensor 423 and a fourth pressure sensor 424 are used to measure an internal pressure of the second inflation body 428, and a fifth pressure sensor 433 is used to measure an internal pressure of the pressurized tube section. The internal pressure of the pressurized tube section is used for inverting and pushing the hose. That is, the internal pressure of the pressurized tube section provides the pneumatic power needed for inverting the hose, and thus is generally high. In order to further ensure the safety of the device, the pressurized tube section is generally provided with an anti-inflation hole 431. As shown in FIG. 6, the anti-inflation hole 431 is normally closed. When the internal pressure of the pressurized tube section reaches a certain threshold, the anti-inflation hole 431 is opened to release the pressure.

Figure 14:
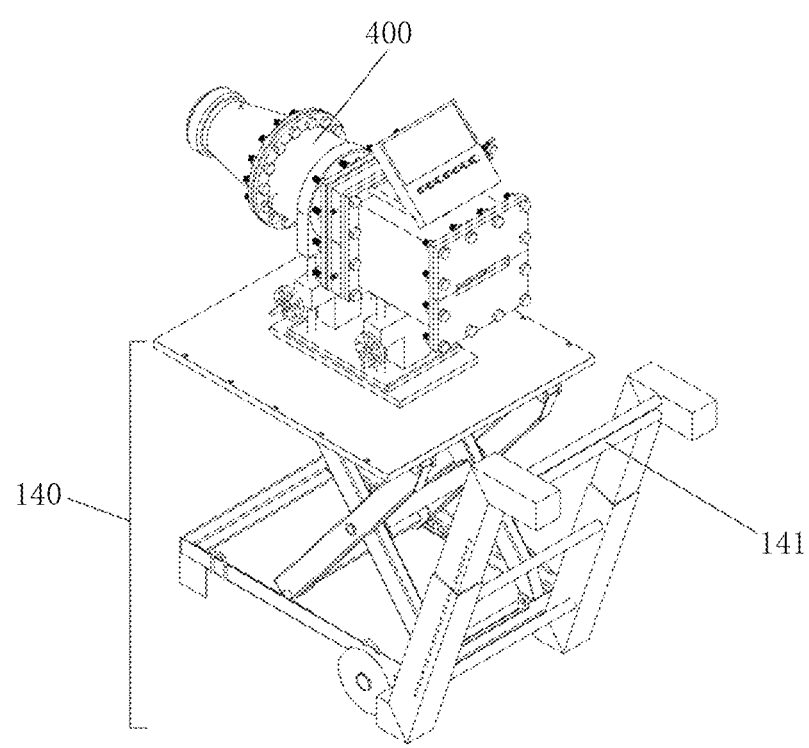
FIG. 14 is a perspective view of the inversion machine 400 mounted on a movable bracket 140.
Figure 15:
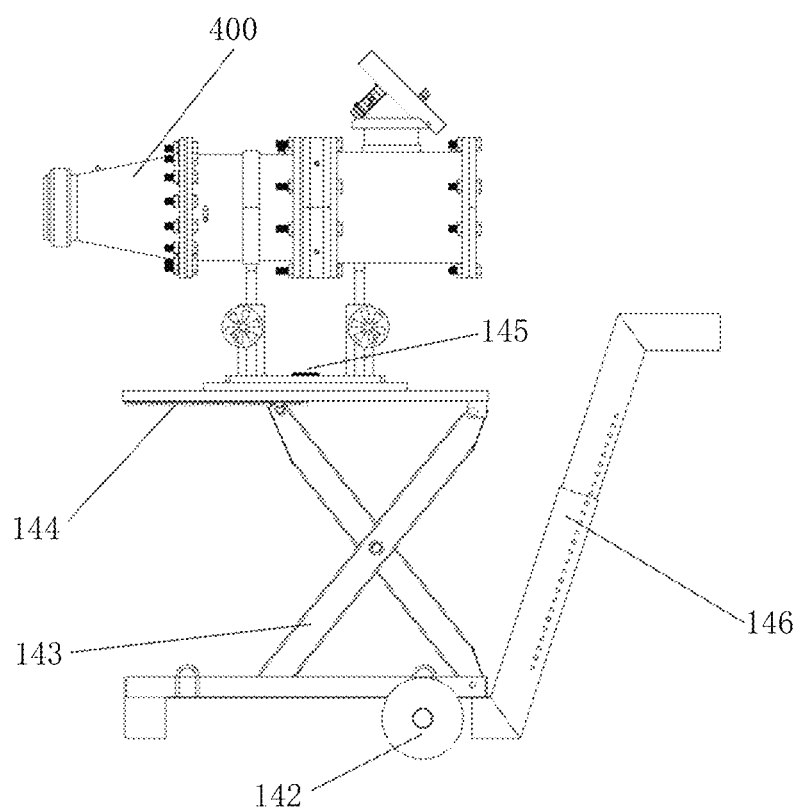
FIG. 15 is a front view of the inversion machine 400 mounted on the movable bracket 140.

As shown in FIGS. 14 and 15, in a preferred embodiment, the bracket body of the movable bracket 140 includes a lifting mechanism 143 for adjusting a vertical distance between the second mounting seat and the wheel 142, so as to adjust a height of the second mounting seat via the lifting mechanism 143. Specifically, the lifting mechanism 143 may be designed as a scissor lift mechanism 143. As shown in FIG. 15, the bottom of the second mounting seat is provided with multiple positioning grooves 144. When the lifting mechanism 143 is engaged with different positioning grooves 144, an included angle between two scissor arms is different, thereby changing the overall height of the lifting mechanism 143. It is further preferable that, the movable bracket 140 may be provided with the wheel 142 on only one side of the bracket body, while a pad is provided on the other side. For example, in this embodiment, the wheel 142 is mounted on only one side of the bracket body close to a handle. In this case, the worker may first apply a rotating force on the handle relative to the wheel 142, lifting the pad at the other side off the ground, and then apply another force on the handle to move the movable bracket 140 forward or backward. When the movable bracket 140 is moved to a target position, the other side of the bracket body with the pad is lowered, so that the pad contacts the ground, and the movable bracket 140 is better kept at the target position with the friction between the pad and the ground.

As shown in FIGS. 14 and 15, in a preferred embodiment, the handle of the movable bracket 140 includes a telescopic arm 146 with an adjustable length, which is convenient for workers with different heights to operate the movable bracket 140, and reduces the size of the movable bracket 140 when it is put away. Two unpowered rollers 141 may be arranged in parallel on the handle of the movable bracket 140 for guiding and flattening the hose, that is, the hose 802 in the second state first passes between the two unpowered rollers 141, and then passes through the inversion machine 400. As shown in FIGS. 7 and 15, in this embodiment, the bracket body is connected to the fixing mounting hole 470 on the base of the inversion machine 400 through a fixing rod 145, so that the inversion machine 400 is mounted on the movable bracket 140.

As shown in FIGS. 1 and 2, in a preferred embodiment, a movable bracket storage cabinet 102 is provided in the box body, and the movable bracket 140 may be stored in the movable bracket storage cabinet 102 when not in use. In order to make better use of the space in the box body, the movable bracket storage cabinet 102 may be a wall cabinet. In this embodiment, a dry hose material cabinet 104 provides the dry hose material storage area, and the dry hose 800 to be applied is placed in the dry hose material cabinet 104, so that the workers can take it quickly. The dry hose material cabinet 104 is preferably a wall cabinet to maximize the use of space in the box body. The matrix material storage area and the guide tube storage area may be directly arranged on the floor of the box body. For example, multiple barrels of the matrix material 900 are placed in rows along a side wall of the box body. In addition, the guide tube 110 is generally made of flexible plastics, and thus it can be folded for storage. Based on this feature, a guide tube material cabinet similar to the dry hose material cabinet 104 or the movable bracket storage cabinet 102 may be provided in the box body to provide the guide tube storage area. The vehicle-mounted support frame 101 is preferably a frame with adjustable posture. For example, the vehicle-mounted support frame 101 has at least one of the following adjustable functions: mobility in the horizontal direction, mobility in a height direction, and rotatability within a certain angular range (such as 90 degrees, 180 degrees, 360 degrees) horizontally.

It is further preferable that, at least one of the following devices is provided in the box body: an illuminating device 103 for providing sufficient light sources, a temperature control system 105 for keeping the temperature in the box body constant, and a tool cabinet 107 for accommodating tools needed for the construction process. Generally, the temperature of the matrix should not be too high in use, and the temperature control system 105 can better meet the temperature requirements of the matrix performance.

In this specification, the structure of each part is described in a progressive manner, and the description of the structure of each part mainly focuses on its differences from the existing structure. The whole and partial structures of the inversion lining rehabilitation equipment may be obtained by combining the structures of multiple parts described hereinabove.

Based on the inversion lining rehabilitation equipment provided according to the present disclosure, an inversion lining rehabilitation method for pipe rehabilitation and reinforcement is further provided according to the present disclosure, which specifically includes the following steps.

In step S1, the working vehicle 100 is driven to the worksite and parked at the worksite, with the rear of the vehicle facing a working hole 120 on the ground, and the inversion machine 400 is mounted to the vehicle-mounted support frame 101 or the movable bracket 140.

In step S2, the matrix is taken from the matrix material storage area and put into the matrix mixing device 200 to be mixed uniformly.

In step S3, the dry hose 800 is taken from the dry hose material storage area, laid on the hose impregnating and flattening device 300, filled with the matrix discharged through the material discharge hole 202 of the matrix mixing device 200, and flattened by the pressure roller groups of the hose impregnating and flattening device 300 to obtain a hose to be applied.

In step S4, an end of the hose to be applied is passed through the inversion machine 400, and is inverted and fixed on an outlet of the inversion machine 400.

In step S5, the guide tube 110 is taken from the guide tube storage area, one end of the guide tube 110 is placed in the working hole 120 to be aligned with a pipe 130 to be repaired, and the other end of the guide tube 110 is aligned with the outlet of the inversion machine 400.

In step S6, the air pump 500 is started, and the hose to be applied is pushed forward by pneumatic power, so that the hose to be applied enters the pipe 130 to be repaired through the guide tube 110.

As shown in FIGS. 3 and 16, if there is sufficient space at the worksite, the working vehicle 100 may be directly parked at the working hole 120, and the inversion machine 400 is mounted on the vehicle-mounted support frame 101 for use. If the space at the worksite is limited and the working vehicle 100 cannot reach the working hole 120, the inversion machine 400 may be mounted on the movable bracket 140, which is then moved to the working hole 120.

By providing the movable bracket 140, the inversion lining rehabilitation equipment is more adaptive to different environmental conditions.

The hose to be applied obtained in step S3 is the hose 802 in the second state shown in FIG. 1. The hose 802 in the second state is inverted after passing through the inversion machine 400, moves forward along the guide tube 110 under the action of the air pressure, and finally enters the pipe 130 to be repaired. The matrix impregnated in the hose is located on an outer surface of the inverted hose to be bonded and fixed to an inner wall of the pipe 130 to be repaired, that is, a hose 804 in a fourth state is fixedly connected to the pipe 130 to be repaired through the matrix. In order to facilitate reuse of the guide tube 110, the guide tube 110 is generally made of specialized plastics such as tetrafluoroethylene, so that it will not adhere to the matrix, that is, a hose 803 in a third state will not adhere to the guide tube 110. It should be noted that in a final stage of pipe rehabilitation and reinforcement, the hose 803 in the third state should be cut off from the hose 804 in the fourth state.

In a preferred embodiment, in the step S2, the matrix mixing device 200 is vacuumized during the process of mixing the matrix, so as to remove the air in the mixed matrix. In the step S3, the air in the hose is continuously pumped out by negative pressure suction in the flattening process.

Based on the above description of the disclosed embodiments, those skilled in the art are capable of carrying out or using the present disclosure. Various modifications to the embodiments are obvious to those skilled in the art, and general principles defined herein may be implemented in other embodiments without departing from the spirit or scope of the present disclosure. Therefore, the present disclosure is not limited to the embodiments described herein, but should be in accordance with the broadest scope consistent with the principle and novel features disclosed herein.

The invention claimed is:

1. Inversion lining rehabilitation equipment for pipe rehabilitation and reinforcement, comprising:
    a working vehicle, provided with a box body and a vehicle-mounted support frame that is located at the rear of the vehicle, wherein the box body is provided with a first accommodation space, in which a dry hose material storage area, a matrix material storage area and a guide tube storage area are provided;
    a power supply unit, located in the first accommodation space;
    a matrix mixing device, located in the first accommodation space close to the front of the vehicle;
    a hose impregnating and flattening device, located in the first accommodation space close to the middle of the vehicle;
    a hose inversion device, comprising an inversion machine and an air pump; and
    a movable bracket, comprising a bracket body and a wheel arranged at the bottom of the bracket body, wherein
    the top of the vehicle-mounted support frame is provided with a first mounting seat to be detachably connected with the inversion machine, the top of the bracket body is provided with a second mounting seat to be detachably connected with the inversion machine, and the inversion machine comprises:
        a pressurized tube section, wherein an end of the pressurized tube section is provided with a round hose outlet, and a first inflation body, which is inflatable and annular, is provided on an outer wall of the hose outlet;
        a sealing tube section, wherein an end of the sealing tube section is provided with an end plate having a hose inlet, at least one sealing body is provided inside the sealing tube section and is deformable to be in seal contact with a hose, the at least one sealing body comprises a first sealing body and a second sealing body that are sequentially arranged in a direction from the hose inlet to the hose outlet, the first sealing body comprises a pair of sealing rollers, a spacing between the pair of sealing rollers is adjustable, a sealing curtain is connected between each of the pair of sealing rollers and an inner wall of the sealing tube section, and the second sealing body comprises a pair of inflatable third inflation bodies; and
        a sealing assembly, located between the sealing tube section and the pressurized tube section, and comprising a first sealing plate, a second sealing plate and a sealer, wherein the sealer is clamped between the first sealing plate and the second sealing plate, each of the first sealing plate and the second sealing plate is provided with an elongated port for the hose to pass through, and the sealer is provided with an inflatable second inflation body.

2. The inversion lining rehabilitation equipment according to claim 1, further comprising a vacuum pumping device that is located in the first accommodation space and is connected to the matrix mixing device through a pipeline.

3. The inversion lining rehabilitation equipment according to claim 2, wherein the bracket body comprises a lifting mechanism for adjusting a vertical distance between the second mounting seat and the wheel.

4. The inversion lining rehabilitation equipment according to claim 1, wherein the hose impregnating and flattening device comprises:
    a frame, provided with a conveying line in a direction from the front to the rear of the vehicle;
    a first pressure roller group, comprising at least one pair of smooth round rollers; and
    a second pressure roller group, comprising at least one pair of grooved rollers, wherein
    the second pressure roller group is located downstream of the first pressure roller group on the conveying line.

5. The inversion lining rehabilitation equipment according to claim 4, wherein the conveying line comprises a first conveying section located upstream of the first pressure roller group and a second conveying section located downstream of the second pressure roller group, wherein each of the first conveying section and the second conveying section is provided with a plurality of unpowered conveying rollers, and an end of the first conveying section away from the first pressure roller group extends upward at an angle.

6. The inversion lining rehabilitation equipment according to claim 5, wherein the bracket body comprises a lifting mechanism for adjusting a vertical distance between the second mounting seat and the wheel.

7. The inversion lining rehabilitation equipment according to claim 4, wherein the bracket body comprises a lifting mechanism for adjusting a vertical distance between the second mounting seat and the wheel.

8. The inversion lining rehabilitation equipment according to claim 1, wherein the inversion machine comprises:
    a machine body, comprising the sealing tube section, the pressurized tube section and the sealing assembly;

a base, provided with a fixing mounting hole; and an adjusting mechanism, connected to the machine body and the base and configured to adjust relative positions of the machine body and the base, wherein the adjusting mechanism comprises a handwheel and a lifting rod drivingly connected to the handwheel, and the lifting rod is connected to the machine body.

9. The inversion lining rehabilitation equipment according to claim 8, wherein the bracket body comprises a lifting mechanism for adjusting a vertical distance between the second mounting seat and the wheel.

10. The inversion lining rehabilitation equipment according to claim 1, wherein the bracket body comprises a lifting mechanism for adjusting a vertical distance between the second mounting seat and the wheel.

11. The inversion lining rehabilitation equipment according to claim 10, wherein the lifting mechanism is a scissor lift mechanism.

12. An inversion lining rehabilitation method for pipe rehabilitation and reinforcement, carried out with the inversion lining rehabilitation equipment according to claim 1, wherein the method comprises the following steps:

driving the working vehicle to a worksite and parking the working vehicle with the rear of the vehicle facing a working hole on the ground, and mounting the inversion machine to the vehicle-mounted support frame or the movable bracket;

taking a matrix from the matrix material storage area and placing the matrix into the matrix mixing device to mix the matrix uniformly;

taking a dry hose from the dry hose material storage area, laying the dry hose on the hose impregnating and flattening device, filling the dry hose with the matrix discharged through a material discharge hole of the matrix mixing device, and flattening the dry hose with a pressure roller group of the hose impregnating and flattening device to obtain a hose to be applied;

passing an end of the hose to be applied through the inversion machine, and inversing and fixing the end of the hose to be applied to an outlet of the inversion machine;

taking a guide tube from the guide tube storage area, placing one end of the guide tube into the working hole to align with a pipe to be repaired, and aligning the other end of the guide tube with the outlet of the inversion machine; and starting the air pump, and pushing the hose to be applied forward with pneumatic power, so that the hose to be applied enters the pipe to be repaired through the guide tube.

* * * * *